(12) United States Patent
Leung et al.

(10) Patent No.: US 8,149,215 B2
(45) Date of Patent: Apr. 3, 2012

(54) CURSOR CONTROL METHOD APPLIED TO PRESENTATION SYSTEM AND COMPUTER READABLE STORAGE MEDIUM

(75) Inventors: Chee-Chun Leung, Tao Yuan Shien (TW); Yun-Cheng Liu, Tao Yuan Shien (TW); Ching-Chun Chiang, Tao Yuan Shien (TW); Maw-Lin Hsu, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 931 days.

(21) Appl. No.: 11/987,087

(22) Filed: Nov. 27, 2007

(65) Prior Publication Data

US 2008/0309619 A1 Dec. 18, 2008

(30) Foreign Application Priority Data

Jun. 12, 2007 (TW) .............................. 96121121 A

(51) Int. Cl.
*G06F 3/033* (2006.01)
*G09G 5/08* (2006.01)
(52) U.S. Cl. ..................... 345/158; 345/156; 345/157
(58) Field of Classification Search .................. 345/158, 345/157, 156, 172–182; 353/42; 715/858
See application file for complete search history.

(56) References Cited

U.S. PATENT DOCUMENTS

| 5,297,254 A | * | 3/1994 | Arai et al. | 345/443 |
| 6,275,214 B1 | * | 8/2001 | Hansen | 345/158 |
| 6,727,885 B1 | * | 4/2004 | Ishino et al. | 345/156 |
| 2002/0089489 A1 | | 7/2002 | Carpenter | |
| 2002/0118891 A1 | * | 8/2002 | Rudd et al. | 382/282 |
| 2005/0260986 A1 | * | 11/2005 | Sun et al. | 455/433 |
| 2006/0214911 A1 | * | 9/2006 | Miller | 345/157 |

* cited by examiner

*Primary Examiner* — Alexander Eisen
*Assistant Examiner* — Sanjiv D Patel
(74) *Attorney, Agent, or Firm* — Thomas, Kayden, Horstemeyer & Risley, LLP

(57) ABSTRACT

The invention discloses a cursor control method applied to a presentation system. The presentation system comprises a computer, an imaging plane, an optical pointer, a camera, and a projector. The projector is a mobile or built-in projector of the computer for projecting output from the computer onto the imaging plane, wherein the output of the computer comprises an internal cursor generated by the computer. The optical pointer is used for projecting an external cursor onto the imaging plane. The camera is a mobile or built-in camera of the computer for capturing an image of the imaging plane. After capturing the image, a processor of the computer detects both a first position of the external cursor and a second position of the internal cursor corresponding to the image, calculates a shift vector between the first and second positions, and moves the internal cursor based on the shift vector.

9 Claims, 5 Drawing Sheets

CURSOR CONTROL METHOD APPLIED TO PRESENTATION SYSTEM AND COMPUTER READABLE STORAGE MEDIUM

BACKGROUND OF THE INVENTION

1. Field of the Invention

The invention relates to a method and system for remotely controlling a cursor generated by a computer by utilizing an optical pointer.

2. Description of the Prior Art

In recent years, the method and system for remotely controlling a computer has been developed, such as invention disclosed in U.S. Pat. No. 6,275,214 (hereinafter '214 patent). Please refer to FIG. 1. FIG. 1 is a schematic diagram illustrating a presentation system 1 of the '214 patent.

As depicted in FIG. 1, a computer 10 is respectively connected to a projector 12 and a camera 14. The projector 12 projects an image 16 outputted from the computer 10 onto an imaging plane 18, such as a screen. An optical pointer 24 projects an external cursor 22 onto the imaging plane 18. The camera 14 captures the image 16 and the external cursor 22 on the imaging plane 18. Afterward, the captured image 16 and the external cursor 22 are processed by the computer 10 to generate a suitable command for moving an internal cursor 26 to a position near where the external cursor 22 is located.

However, the projected or captured image 16 has to be re-calibrated once one of the following happens: the projector 12 or the camera 14 is shifted, the camera lens is seriously twisted, or the point of view is inaccurate. The '214 patent calibrates the image 16 captured by the camera 14 by utilizing reticla C1-C4. Because the '214 patent utilizes linear interpolation for calibration, it cannot compensate lens for non-linear inaccuracy. If there is an inaccuracy between the projector 12 (or the camera 14) and the imaging plane 18, the internal cursor 26 cannot be controlled precisely even though it has been re-calibrated.

Therefore, the main scope of the invention is to provide a method and system for precisely controlling a cursor, so as to solve the aforesaid problems.

SUMMARY OF THE INVENTION

A scope of the invention is to provide a method and system for remotely controlling a cursor generated by a computer by utilizing an optical pointer.

According to a preferred embodiment, the method of the invention for controlling a cursor is applied to a presentation system. The presentation system comprises a computer, an imaging plane, an optical pointer, a camera, and a projector. The projector is a mobile or built-in projector in relation to the computer and used for projecting the output from the computer onto the imaging plane, wherein the output comprises an internal cursor generated by the computer. The optical pointer is used for projecting an external cursor onto the imaging plane. The camera is a mobile or built-in camera in relation to the computer and used for capturing an image of the imaging plane.

In this embodiment, after capturing the image, the processor detects both a first position of the external cursor and a second position of the internal cursor corresponding to the image, calculates a shift vector between the first and second positions, and moves the internal cursor based on the shift vector.

Because the invention moves the internal cursor displayed by the computer based on the distance between the internal cursor and the external cursor within the captured image, even if the camera lens is seriously twisted or the point of view is inaccurate, the invention can still provide good compensation. In other words, even though the projector or the camera is shifted a little, the cursor can still be controlled precisely by the invention.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
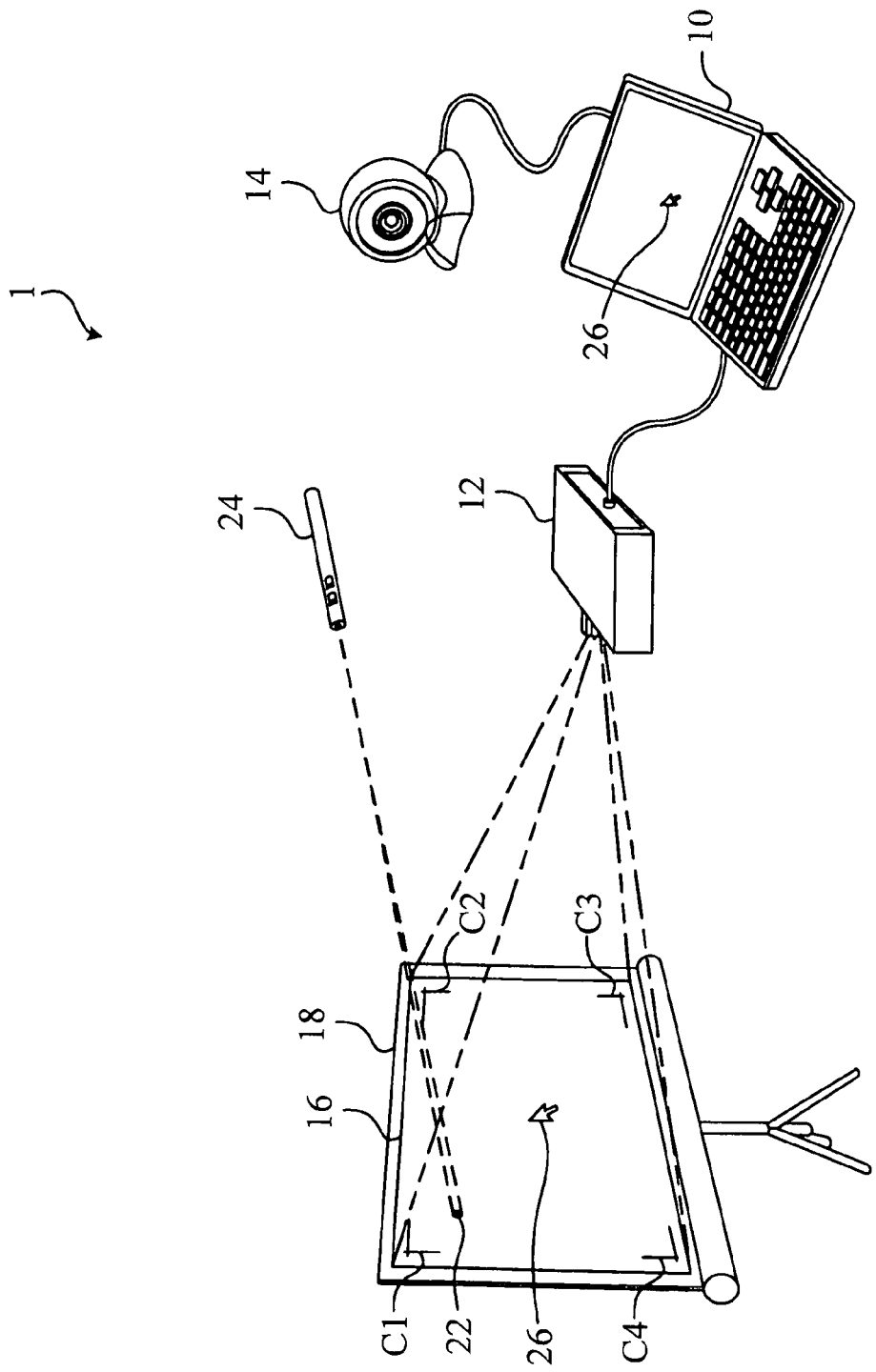
FIG. 1 is a schematic diagram illustrating a presentation system of the '214 patent.
Figure 2:
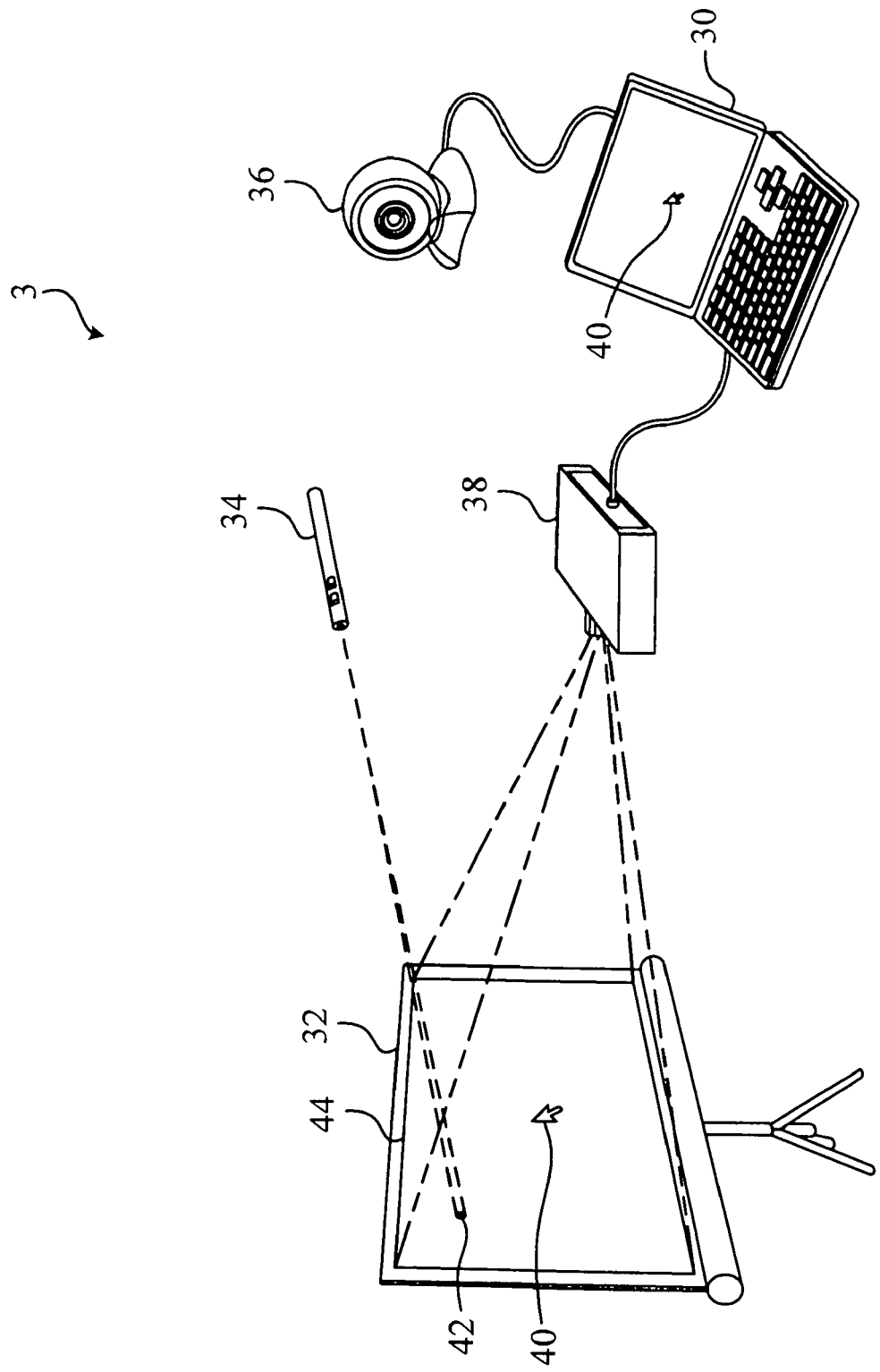
FIG. 2 is a schematic diagram illustrating a presentation system according to a preferred embodiment of the invention.
Figure 3:
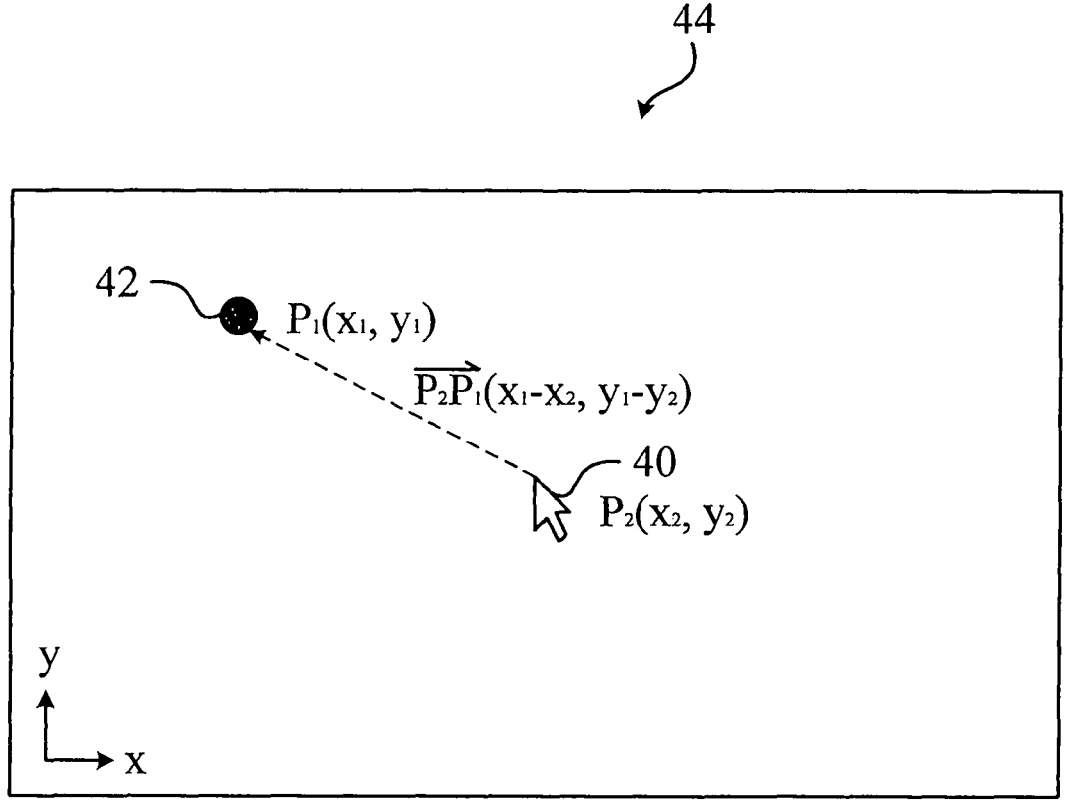
FIG. 3 is a schematic diagram illustrating a shift vector between an internal cursor and an external cursor.

Please refer to FIG. 2 and FIG. 3. FIG. 2 is a schematic diagram illustrating a presentation system 3 according to a preferred embodiment of the invention. FIG. 3 is a schematic diagram illustrating a shift vector $\overrightarrow{P_2P_1}$, between an internal cursor 40 and an external cursor 42.

A presentation system 3 comprises a computer 30, an imaging plane 32, an optical pointer 34, a camera 36, and a projector 38. The camera 36 and the projector 38 could be mobile or built-in the computer 30, such as a web camera. The camera 36 and the projector 38 can also be integrated into the computer 30 or an electronic device associated with the computer 30. In this embodiment, the camera 36 and the projector 38 are mobile ones associated with the computer 30, as depicted in FIG. 2.

The imaging plane 32 is associated with the computer 30 for displaying an output of the computer 30, wherein the output of the computer 30 comprises an internal cursor 40 generated by the computer 30. The imaging plane 32 could be a passive screen, such as projector screen, wall, and so on. The imaging plane 32 could also be an active screen, such as monitor, television, and so on. In this embodiment, the imaging plane 32 is a projector screen placed far away from the computer 30. The projector 38 projects the output from the computer 30 onto the imaging plane 32.

The optical pointer 34 is used for projecting an external cursor 42 onto the imaging plane 32. The optical pointer 34 could be a hand-held laser pointer or the like. Afterward, the camera 36 captures the image 44 of the imaging plane 32 and then transmits the image 44 to the computer 30.

After capturing the image 44, the processor (not shown) of the computer 30 will detect a first position P1(x1,y1) of the external cursor 42 and a second position P2(x2,y2) of the internal cursor 40 corresponding to the image 44, calculate a shift vector $\overrightarrow{P_2P_1}$ (x1-x2, y1-y2) from the second position P2 with respect to the first position P1 and, based on the shift vector $\overrightarrow{P_2P_1}$, move the internal cursor 40 from the absolute position within the computer 30 to the position near where the external cursor 42 is located.

For instance, the processor of the computer 30 detects brightness of the external cursor 42 on the image 44 to obtain the first position P1. Because the external cursor 42 is projected by the optical pointer 34, the external cursor 42 is the brightest point among the image 44. Therefore, the processor of the computer 30 detects the brightest point on the image 44 as the first position P1 of the external cursor 42.

Furthermore, the processor of the computer 30 detects color and/or shape of the internal cursor 40 on the image 44 to obtain the second position P2. For instance, if the color and/or shape of the internal cursor 40 is known, the processor of the computer 30 detects the known color and/or shape of the internal cursor 40 in the image 44, so as to obtain the second position P2 of the internal cursor 40. Moreover, in practical applications, the processor of the computer 30 could adjust the color of the internal cursor 40 based on the background color of the output from the computer 30. For example, if the background color of the position where the internal cursor 40 is located is black, the processor adjusts the color of the internal cursor 40 to be white. Accordingly, the second position P2 of the internal cursor 40 can be detected precisely.

Figure 4:
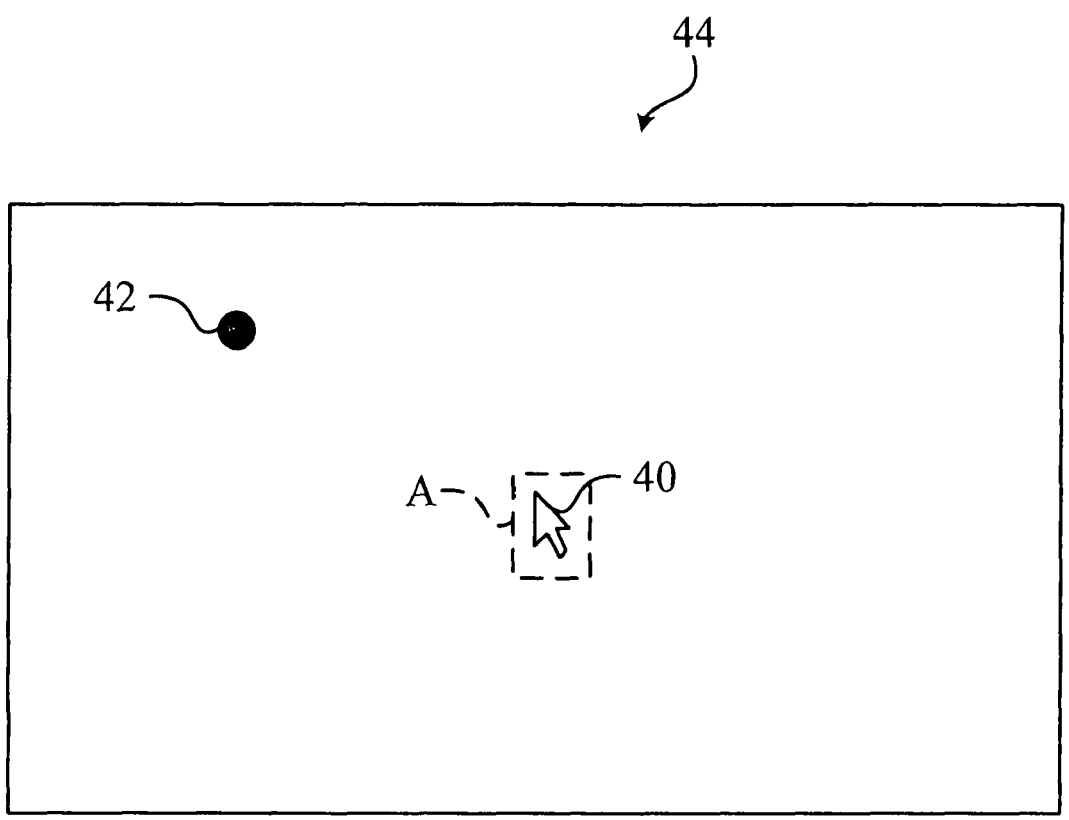
FIG. 4 is a schematic diagram setting a search area to detect the internal cursor therein.

In another preferred embodiment, the processor of the computer 30 could set a search area A on the image 44 captured by the camera 36 based on an absolute position where the internal cursor 40 is located in the computer 30, and it could detect the second position P2 of the internal cursor 40 corresponding to the image 44 in the search area A, as depicted in FIG. 4. Accordingly, it could reduce lots of calculation for the processor.

It should be noted that if the resolution of the camera 36 is different from that of the computer 30, it has to amplify the shift vector $\overline{P_2P_1}$, relatively. For instance, if the resolution of the camera 36 is 320*240, and the resolution of the computer 30 is 640*480, the shift vector $\overline{P_2P_1}$ has to be amplified to double the value, such that the internal cursor 40 can be moved from the absolute position within the computer 30 to the position near where the external position 42 is located.

Figure 5:
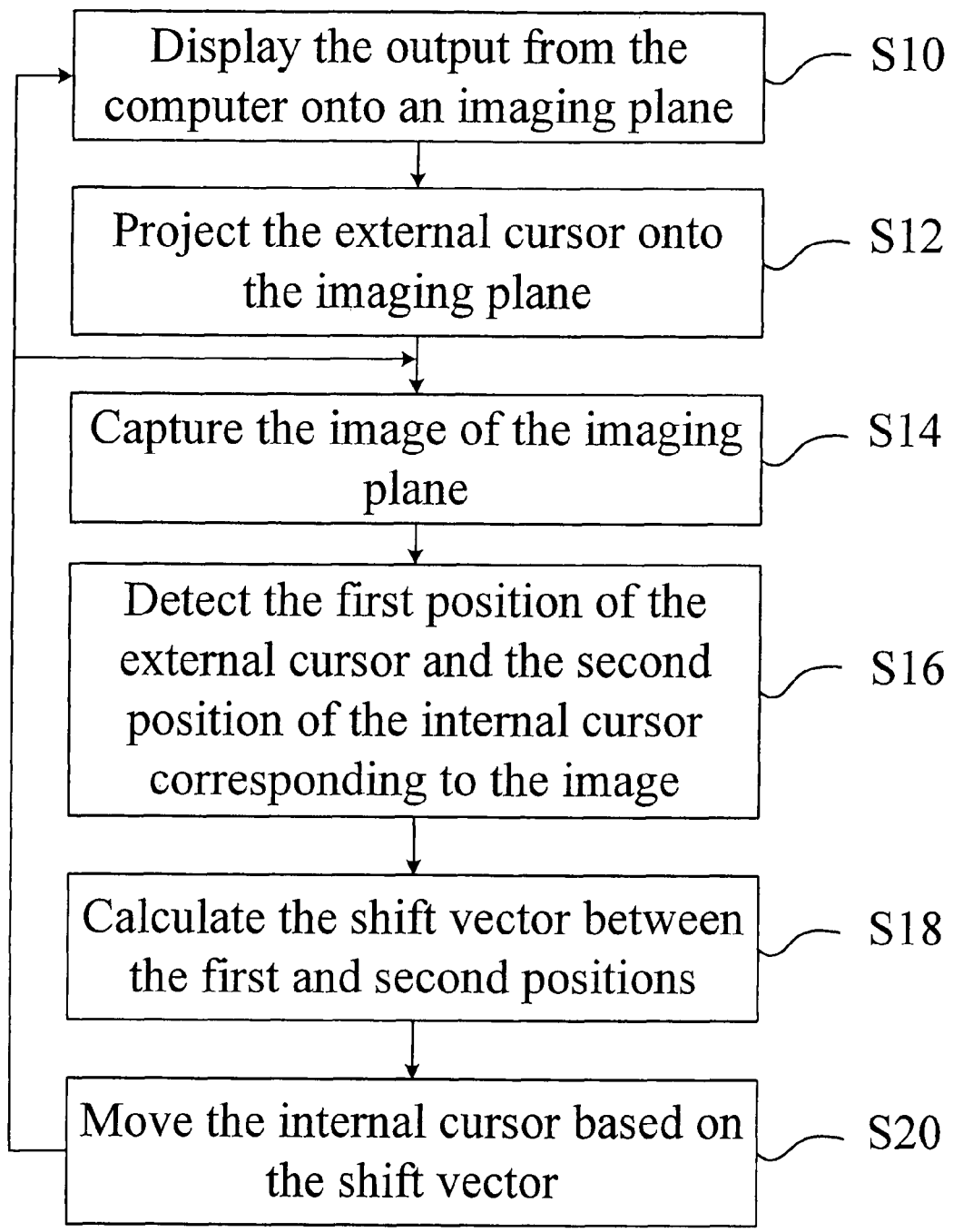
FIG. 5 is a flow chart showing a method for controlling the cursor according to a preferred embodiment of the invention.

Please refer to FIG. 5. FIG. 5 is a flow chart showing a method for controlling the cursor according to a preferred embodiment of the invention. First of all, step S10 is performed to display the output from the computer 30 onto the imaging plane 32. Afterward, step S12 is performed to project the external cursor 42 onto the imaging plane 32. Step S14 is then performed to capture the image 44 of the imaging plane 32. Step S16 is then performed to detect the first position P1 of the external cursor 42 and the second position P2 of the internal cursor 40 corresponding to the image 44. Step S18 is then performed to calculate the shift vector $\overline{P_2P_1}$ between the first position P1 and second position P2. Finally, step S20 is performed to move the internal cursor 40 based on the shift vector $\overline{P_2P_1}$.

In another preferred embodiment, the control logic depicted in FIG. 5 could be achieved by software. The software is executable in a computer, such as a laptop or a desktop. Certainly, each unit or function of the control logic could be achieved by hardware, software, or any combination of hardware and software. Furthermore, the control logic depicted in FIG. 5 could be implemented in data stored in a computer readable storage medium, wherein the computer readable storage medium could be a floppy disk, a hard disk, an optical disk and other magnetic device, optical device or any combination of both. The data stored in the computer readable storage medium representing instructions can be executed by a computer to generate control commands for remotely controlling the cursor.

Compared with the prior art, because the invention moves the internal cursor of the output from the computer based on the distance between the internal cursor and the external cursor, even if the camera lens is seriously twisted or the point of view is inaccurate, the invention can still provide good compensation. In other words, even though the projector or the camera is shifted a little, the cursor can still be controlled precisely by the invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A cursor controlling method, an imaging plane being associated with a computer for displaying an output from the computer, an external cursor being projected onto the imaging plane, the output comprising an internal cursor generated by the computer, the method comprising steps of:
    (a) capturing an image from the imaging plane;
    (b) adjusting the color of the internal cursor based on the background color of the output from the computer;
    (c) obtaining a first position of the external cursor by detecting the brightness of the external cursor;
    (d) setting a search area on the image based on an absolute position of the internal cursor in the computer;
    (e) obtaining a second position of the internal cursor by detecting the color or the shape of the internal cursor within the search area of the image;
    (f) calculating a shift vector between the first and second positions; and
    (g) moving the internal cursor based on the shift vector.

2. The method of claim 1, wherein a step (a) comprises step of:
    utilizing a mobile or built-in camera of the computer to capture the image.

3. The method of claim 1, wherein step (d) comprises step of:
    based on the shift vector, moving the internal cursor from the absolute position.

4. The method of claim 1, further comprising step of:
    utilizing an optical pointer to project the external cursor onto the imaging plane.

5. The method of claim 1, wherein the imaging plane is one selected from a group consisting of a projector screen, a wall, a monitor and a television.

6. A presentation system, comprising:
    a computer comprising a processor;
    an imaging plane, associated with the computer, for displaying an output from the computer, the output comprising an internal cursor generated by the computer;
    an optical pointer for projecting an external cursor onto the imaging plane; and
    a mobile or built-in camera in relation to the computer for capturing an image of the imaging plane;
    wherein, the processor adjusts the color of the internal cursor based on background color of the output from the computer, after capturing the image, the processor obtains a first position of the external cursor by detecting the brightness of the external cursor, sets a search area on the image based on an absolute position of the internal cursor in the computer, obtains a second position of the internal cursor by detecting the color or the shape of the internal cursor within the search area of the image, calculates a shift vector between the first and second positions, and moves the internal cursor based on the shift vector.

7. The presentation system of claim 6, wherein the processor moves the internal cursor from the absolute position based on the shift vector.

8. The presentation system of claim 6, further comprising a mobile or built-in projector in relation to the computer for projecting the output from the computer onto the imaging plane.

9. The presentation system of claim 6, wherein the imaging plane is one selected from a group consisting of a projector screen, a wall, a monitor and a television.

* * * * *